United States Patent [19]

Tacconi

[11] Patent Number: 4,803,916

[45] Date of Patent: Feb. 14, 1989

[54] MACHINE FOR RAPIDLY COOKING BATCHES OF SPAGHETTI

[75] Inventor: Antonio Tacconi, Florence, Italy

[73] Assignee: Soimex S.r.L., Florence, Italy

[21] Appl. No.: 46,914

[22] PCT Filed: Jul. 31, 1986

[86] PCT No.: PCT/IT86/00063

§ 371 Date: Mar. 31, 1987

§ 102(e) Date: Mar. 31, 1987

[87] PCT Pub. No.: WO87/00741

PCT Pub. Date: Feb. 12, 1987

[30] Foreign Application Priority Data

Jul. 31, 1985 [IT] Italy .................................. 9470 A/85

[51] Int. Cl.[4] .......................... A47J 27/18; A47J 27/14
[52] U.S. Cl. ........................................ 99/352; 99/330; 99/355
[58] Field of Search .................. 99/330, 336, 337, 339, 99/352, 355, 356, 367, 360, 403–404, 409–410

[56] References Cited

U.S. PATENT DOCUMENTS

| | | | |
|---|---|---|---|
| 3,827,344 | 8/1974 | Pratolongo | 99/352 |
| 3,937,135 | 2/1976 | Pratolongo | 99/352 |
| 4,214,514 | 7/1980 | Contino | 99/330 |
| 4,543,878 | 10/1985 | Luchetti | 99/330 |
| 4,569,277 | 2/1986 | Stiglich | 99/330 |

FOREIGN PATENT DOCUMENTS

| | | |
|---|---|---|
| 140987 | 5/1985 | European Pat. Off. . |
| 790969 | 2/1958 | United Kingdom . |
| 150362 | 9/1980 | United Kingdom . |

Primary Examiner—Donald Watkins
Attorney, Agent, or Firm—Brumbaugh, Graves, Donohue & Raymond

[57] ABSTRACT

In order to cook a portion or batch of spaghetti rapidly the spaghetti is inserted into a first pre-cooking chamber under pressure, a second chamber cascade connected to the first chamber for completing the cooking process, a stirrer for agitating the "pasta" in the second chamber and microprocessor control means for regulating the residual cooking water left with the cooked "pasta" and for generating the heat for the pre-heating stage and for hydraulic control of inlet and outlet valves in the cooking chamber.

10 Claims, 5 Drawing Sheets

MACHINE FOR RAPIDLY COOKING BATCHES OF SPAGHETTI

This invention relates to a machine for rapidly cooking a batch of spaghetti, said machine being especially but not exclusively intended for being installed within public premises with self-service catering of main courses.

A pressure device is known as disclosed in the Italian Pat. No. 945,990 for rapidly cooking food such as rice, Italian "pasta" or macaroni and the like with a boiler for the hot cooking water, a batcher device for the alimentary produce to be cooked, a kettle for cooking under pressure, a separator for unloading cooked food; however, said already known device has a number of severe drawbacks such as the irregular feeding motion of the alimentary produce, especially in the case of spaghetti, within the batcher device, which drawback gives rise to problems in closing said batcher and in obtaining a regular formation of batches; the steam leakage out the separator each time cooked food is introduced into the same, which drawback causes geared motors and electromagnets employed for moving all various intermittent working members to become unserviceable and consequently the stopping of the device.

The main object of the present invneton is to eliminate all such drawbacks and to propose a high performance and high yield machine.

According to the present invention, said result has been attained by adopting the idea of introducing raw "pasta" into the batcher space avoiding acting on the interception members with the full weight of the "pasta" lying above the same; of arranging the precooking chamber inside the boiler; of moving the machine members by means of hydraulic control cylinders; of conveying hot water and steam discharged from the final cooking chamber into a heat exchanger; of controlling all operative steps by means of a microprocessor control unit.

The advantages obtained through the present invention mainly consist in the fact that the batching operation of raw "pasta" and the introduction of the same into the first cooking chamber are carried out in a rapid and exact way; that it is possible to eliminate heat exchange between the first cooking chamber and the outside, to lower the temperature of water within the boiler and then also to lower heat exchange between the boiler and the outside; that cooked "pasta" can be unloaded and dispensed with no steam leakage; that it is possible to regenerate both water and steam heat before wasting the same; that the temperature of waste water to the sink is kept within limits that are tolerable by collection pipes normally employed; that the hydraulic control cylinders are energized by the same pressurized water fed into the boiler; that it is possible to agitate the "pasta" during the cooking completion step; that a special cycle is provided of switching on for a suitable washing of the cooking chambers and of switching off for the full emptying of the cooking water; that the operative cycle is controlled by a central control unit, for instance a microprocessor programming unit; that a machine realized according to the present invention allows an intermittent cycle working through push-button or coin energizing to be performed, but it also allows a continuous and accelerated cycle to be carried out as in such a case the first and second cooking steps occur simultaneously on two separate batches; that the machine operation is safe and very reliable also after long periods of continuous service.

These and other advantages and features of the present invention will be better understood by those who are skilled in the art by the following disclosure in connection with the enclosed drawings which are presented for exemplification of the finding in question and not for limitative purposes of the same; in the drawings.

Figure 1:
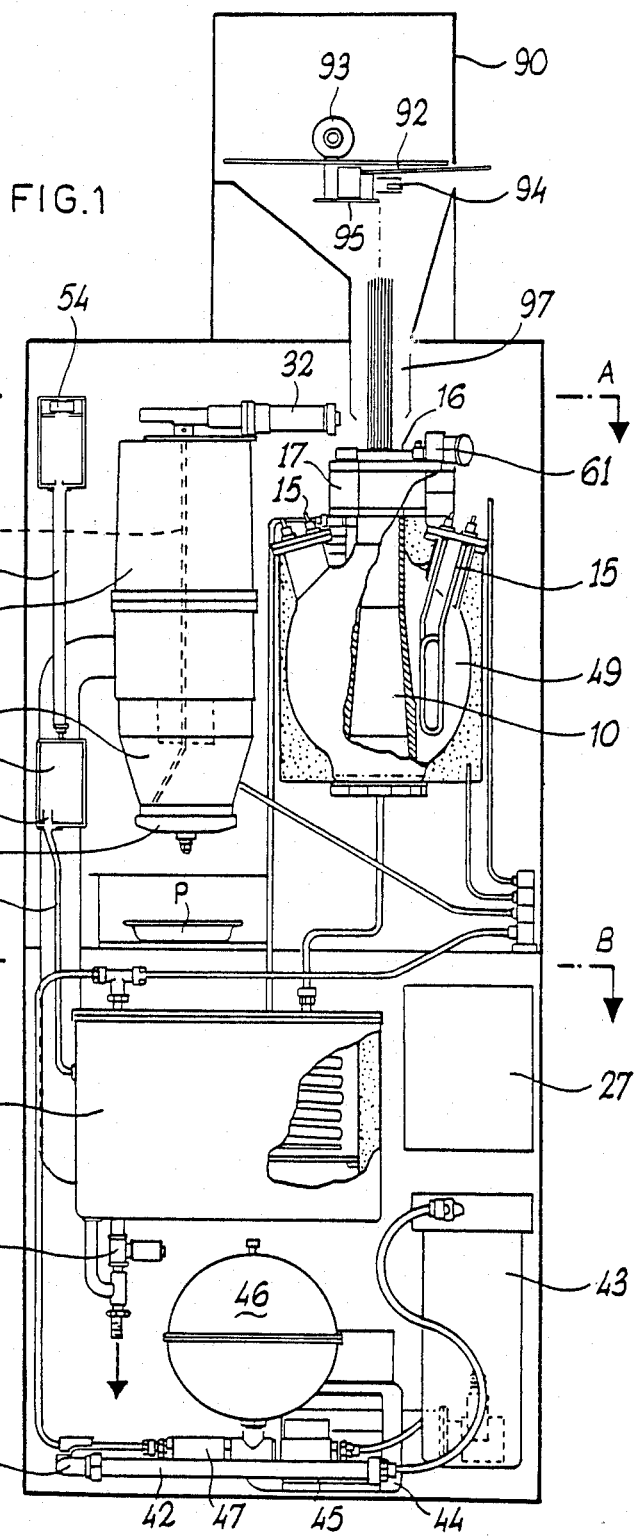
FIG. 1 is a partly cutaway whole front view of a machine realized according to the present invention.
Figure 2:
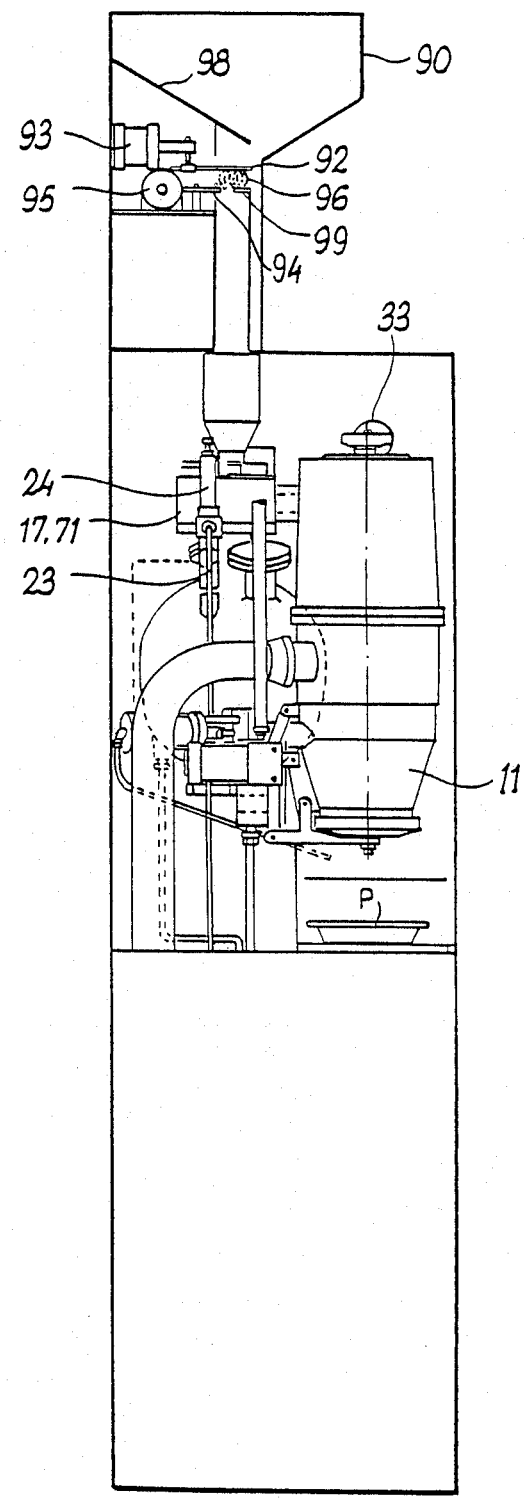
FIG. 2 is a side view of the machine of FIG. 1.
Figure 3:
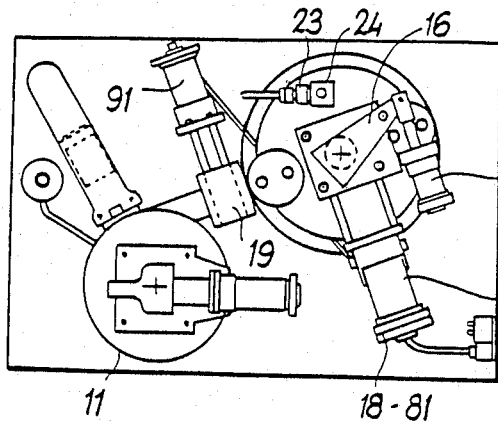
FIG. 3 shows the cross section along A—A of FIG. 1.
Figure 5:
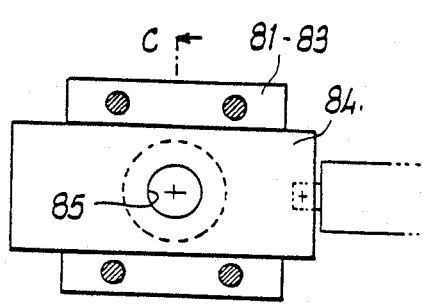
FIG. 5 shows as a front view the detail of a gate valve.
Figure 4:
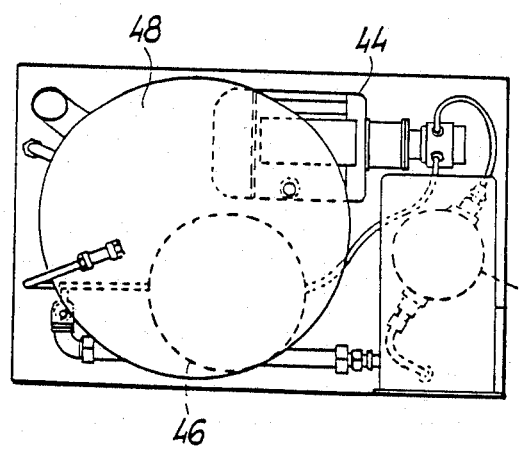
FIG. 4 shows the cross section along B—B of FIG. 1.
Figure 6:
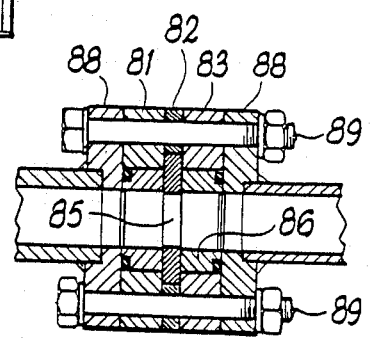
FIG. 6 shows the cross section along C—C of FIG. 5.
Figure 7:
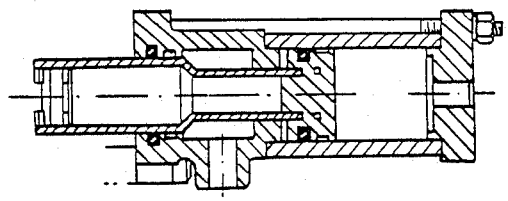
FIG. 7 shows as a longitudinal cross section the detail of a hydraulic control cylinder.
Figure 8:
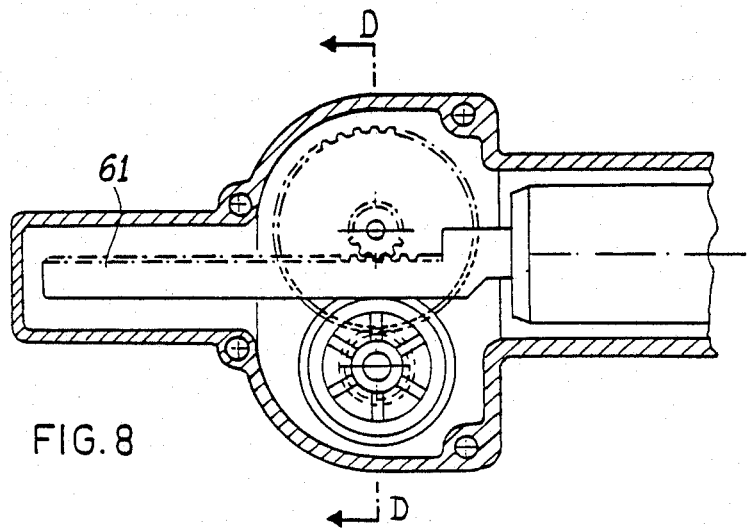
FIG. 8 shows the plan view of the detail of the stirrer.
Figure 9:
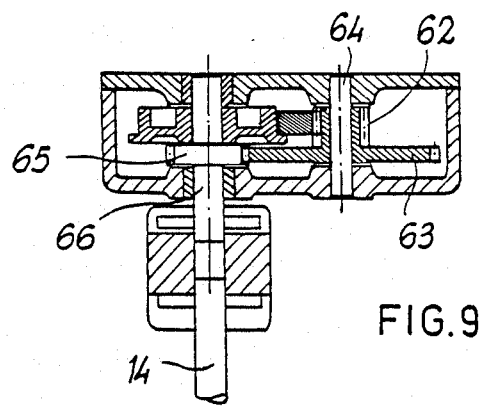
FIG. 9 shows the cross section along D—D of FIG. 8.
Figure 10:
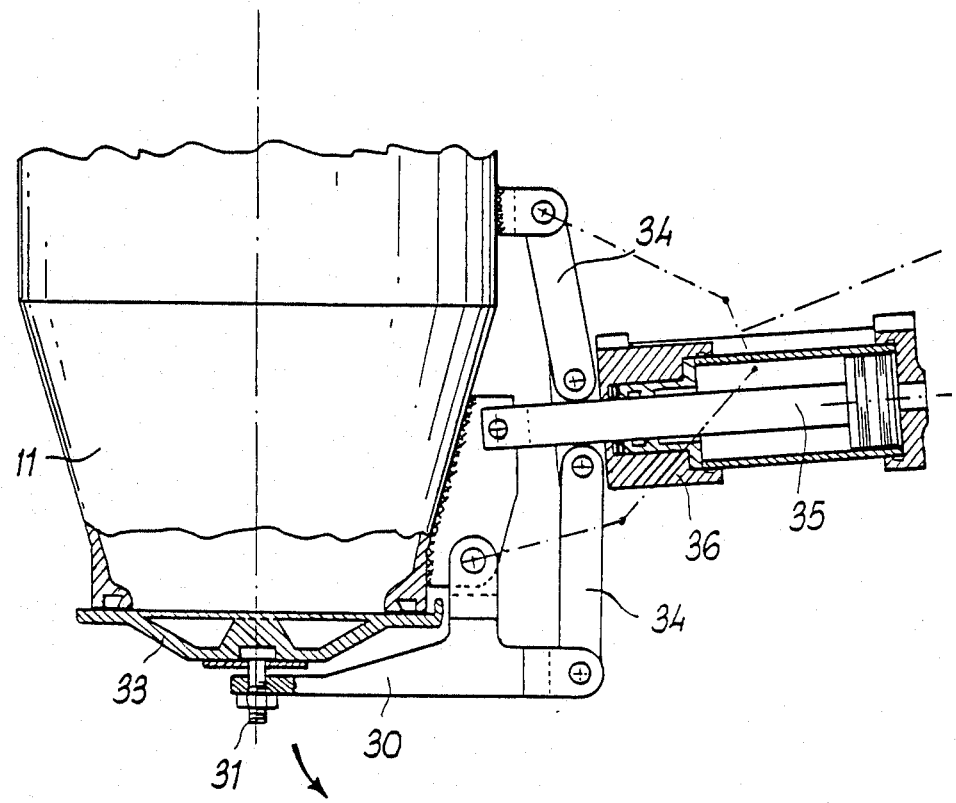
FIG. 10 shows the front view of the detail of the unloading or dispensing door of the second chamber.

Considering the essential structure of the machine according to the present invention and referring to the enclosed drawings, the machine of the invention for rapidly cooking a batch of spaghetti comprises:

(a) means for obtaining batches of the raw "Italian pasta";
(b) means for the production of hot water;
(c) a first pressure cooking chamber;
(d) a final cooking chamber under atmospheric pressure provided with a stirrer for the "pasta" and with a regulating device of the amount of residual water;
(e) a central control unit for controlling the various operative steps according to a programmed cycle.

More particularly:

(a) means for obtaining batches of raw "pašta" comprise: a hopper 90 for supporting the spaghetti as a horizontal pack, a retractile horizontal blade 92 being arranged below the same and being suitable to keep the spaghetti lying above itself and to define, in cooperation with a retractile horizontal tab 94 and with a coplanar fixed stud or lug 99 a batcher space 96. The retraction and then the re-entry of said blade 92 through the action of a hydraulic control cylinder 93, allow said space 96 to be filled by the action of gravity while the overlying bent tile 98 avoids acting with the full weight of the spaghetti contained within the hopper on said blade 92. The extraction of said tab 94 through the hydraulic control cylinder 95 causes the batch of spaghetti to drop into said space 96, and said spaghetti, by rotating around said lug or stud, goes finally in the vertical position into the underlying funnel 97. Each one of said hydraulic control cylinders 93, 95 is essentially made up of a bottom, a chamber and a head; the rod, which is hollow, bears at its ends, respectively, a connection device and a piston. Each cylinder is controlled by one valve only, as the chamber occupied by said rod is kept under pressure so as to obtain the spontaneous return of the piston.

(b) Said means for the production of hot water under pressure comprise:

a pipe for feeding water with drawing of the same from the water pipe network of the city through a tap 41, a device 42 for freeing water from calcium and a filter 43 to a motor pump 44 with a bypass valve and a check valve 45; a pocket accumulator 46 being offtake connected downstream said pump, and already known means being also provided in order to prevent water intended for flowing into the control cylinders from being conveyed to the boiler; a minimum and maximum level pressure switch 47, a heat exchanger 48 and a boiler 49 heated by the electric resistances 15 and provided with a calibrated diaphragm inlet valve 23 and with a spring safety valve 24, complete the whole heating plant.

(c) The first cooling chamber is a body 10 which is frustum shaped at its lower part whereas it is of a cylindrical shape at its upper part and is intercepted in the same by a gate valve 17 interlocked with a hydraulic control cylinder 71, said body being laterally provided with a valve 18 interlocked with a hydraulic control cylinder 81 for the inlet of hot water, as well as with a gate valve 19 interlocked with a hydraulic control cylinder 91 for the outlet of the pre-cooked "pasta". Said body 10 is fully inserted within said boiler 49 in the vertical position and aligned with said batcher funnel 97 and below the same, with the interposition of a diaphragm 16 which is interlocked with a hydraulic control cylinder 61 and moves together with said tab 94 of the batcher device.

Said hydraulic control cylinders, 61, 71, 81, and 91 are similar to said cylinders 93 and 95. Each one of said gate valves 17, 19 is essentially made up of a plane slider 84 bearing a central hole 85 and moves with a straight reciprocating motion between the plates 81, 83 which bear a hole in their centers and are fastened to the block 82 and to the heads 88 by means of bolts 89: a floating, seal bushing 86 is placed at a point between said slider 84 and each one of said heads 88.

(d) The final cooking chamber, working at atmospheric pressure, is a vertical axis body 11 which is laterally connected with the outlet valve 19 of said first cooking chamber 10 and is closed in the upper part by a dome-shaped cover 12 for the expansion of steam that is generated by discharging said first cooking chamber 10 and in the lower part by a double-bottom door 33 which is interlocked with a hydraulic control cylinder 36. Steam so formed is conveyed to the bottom of the heat exchanger 48. An arm 14 vertically passing into the cover and moving with a reciprocating rotatory motion obtained through hydraulic control cylinder 32 with the interposition of a toothed rod 61 and of the idling wheelwork 62, 63 on the common shaft 64 and of the sprocket wheel 65 integral with the shaft 56 of said arm 14, allows the "pasta" contained within the chamber 11 to be removed. The space of said door 33 is connected with a vessel 25 with a spillway 52 whose level can be adjusted as desired with respect to the desired amount of water to be left behind in said chamber 11. A static head column 53 is associated with said vessel 25, the float valve 54 of said column closing when the chamber 10 is unloaded so preventing water and steam from leaking out, and on the contrary opening when the pressure is lowered, so causing said spillway 52 to become active. Hot water flowing out said spillway 52 goes through 55 into said heat exchanger 48 in which a similar spillway keeps constant the level of water that gives off heat. A solenoid valve 28 allows said heat exchanger 48 to be emptied. Said door 33 is assembled on a lever 30 by means of a screw 31 which regulates the closing pressure; said lever 30 is articulated through two link rods 34 with the rod 35 of said hydraulic control cylinder 36 which is advantageously controlled by two valves. Said hydraulic control cyliners 32, 36 are substantially equal to the cylinders 93, 95 already mentioned above.

(e) The central control unit is a microprocessor programming device arranged within a suitable water-tight container 27, the solenoid valves for energizing the various hydraulic control cylinders being arranged as a bank within a zone which is suitably far from water and steam. Said microprocessor is advantageously interfaced in order to detect the positions of the pistons of the various hydraulic control cylinders, as well as temperature and pressure of water so as to control, through corresponding solenoid valves, the hydraulic control cylinders, and, through corresponding switches, the discharge valve 28 of said heat exchanger 48, the motor pump 44 and the electric resistances 15.

Said programming device is suitably instructed to perform either an intermittent working cycle, i.e. for cooking one only portion or batch, with starting obtained by a pushbutton or a coin or a token, or a continuous working cycle, i.e., for cooking a number of portions or batches in a rapid succession. When the machine starts working, the programming device allows a special washing cycle of the cooking chambers to be performed; when the machine stops working, said programming device allows a similar washing cycle of said cooking chambers to be carried out as well as the final emptying of the cooking water.

The steady state working of the machine is as follows. In the "ready" condition, water within the boiler 49 is at the temperature and pressure previously determined as desired, valve 17 is open whereas valves 18–19 are closed, as well as said door 33 and tile 16; the batcher space 96 is supplied with raw "pasta". When the "start" condition sets in, said tab 94 and the diaphragm 16 are retracted, i.e. they are opened, so that the batch or portion of "spaghetti" drops as a bundle drops from the space 96 into the underlying first cooking chamber 10; then suddenly the valve 17 closes whereas valve 18 opens and pressurized hot water floods said chamber 10 passing through said valve 18. The consequent pressure drop of water in the boiler is detected by the pressure switch 47 which energizes the motor pump 44 till the service pressure is reestablished (about 8 atm). After the predetermined time for the first cooking has elapsed (about 50–60 sec.) with the valve 18 closed, valve 19 is opened, which opening gives rise to a sudden pressure drop in the overheated water present within said chamber 10 with immediate formation of steam which causes the spaghetti with the residual water to be expelled into the second cooking chamber 11; from here steam flows into the heat exchanger 48 whereas excess water is conveyed also to said heat exchanger 48 through the spillway 52 of the vessel 25. During the holding time within the chamber 11, the "pasta" is removed by the arm 14; when the cooking operation is over, the door 33 opens so causing the pasta to drop together with the predetermined amount of water into the underlying dish P.

In the practice, the operative details can be changed according to equivalent ways as regards the shape, sizes, arrangement of the machine members, as well as the nature of the materials employed without departing from the scope of the idea adopted and therefore without departing from the spirit of the present invention for which a priority right is claimed.

I claim:

1. A machine for rapidly cooking individual portions of spaghetti or the like comprising, in combination:
   a batcher device for forming and delivering at an outlet a desired portion of raw spaghetti;
   a pressurized water system including a boiler for heating and containing hot water under pressure;
   a first vertically oriented chamber for partial cooking and a second vertically oriented chamber cascade connected with said first chamber for completing the cooking;
   said first chamber being supported inside said boiler below the outlet of said batcher device and provided with a normally closed first gate valve through which, when opened, a portion of raw spaghetti is introduced into said first chamber, a second normally closed gate valve operative when opened to introduce pressurized hot water from said boiler into said first chamber for rapidly partially cooking said portion of spaghetti, and a third normally closed gate valve, which when opened and said second valve is closed, causes a sudden pressure drop and formation of steam in said first chamber and transfer of said portion of partially cooked spaghetti and residual water into said second chamber for completion of the cooking;
   said second chamber having sufficient volume to allow expansion of steam transferred thereto from said first chamber and being closed at its lower end with a normally closed door through which, when opened, said portion of completely cooked spaghetti is removed by gravity.

2. A machine according to claim 1, wherein said water system includes means connected to said second chamber for regulating the amount of residual cooking water to be left with the cooked spaghetti.

3. A machine according to claim 2, wherein said water system further includes a heat exchanger for preheating water to be conveyed to the boiler, and wherein said means for regulating comprises a vessel connected to said second chamber and having a spillway the height of which can be adjusted as desired with respect to the amount of water to be left with cooked spaghetti, and having an outlet connected to said heat exchanger.

4. A machine according to claim 1, wherein said batcher device has a batcher space defined laterally by two opposite vertical walls of a hopper, superiorly by a retractile horizontal blade and, at its lower part, by a retractile horizontal tab in cooperation with a co-planar lug fastened to one wall of said hopper, and further includes means for preventing the full weight of spaghetti contained within said hopper from acting upon said retractile horizontal blade.

5. A machine according to claim 4, wherein said first and third gate valves are actuated by respective hydraulic control cylinders, and wherein a diaphragm is disposed between the outlet of said batcher device and said first gate valve and actuated by a third hydraulic control cylinder synchronously with the retraction of the horizontal tab of said batcher device.

6. A machine according to claim 3, wherein said water system includes means connecting said second chamber to said heat exchanger for conveying said steam and excess cooking water to said heat exchanger for regeneration of the heat contained therein.

7. A machine according to claim 1, wherein the door closing the lower end of said second chamber is supported on a lever by an adjustable screw, and said lever is articulated by two rods linked with a hydraulic control cylinder.

8. A machine according to claim 1, wherein said machine further comprises an interfaced microprocessor device programmed for controllably actuating at least said first, second and third gate valves.

9. A machine according to claim 8, wherein said microprocessor device is programmed to cause said machine to perform either an intermittent working cycle for cooking one portion only, or in the alternative to perform a continuous working cycle for cooking a desired number of portions in rapid succession.

10. A machine according to claim 9, wherein said microprocessor device is programmed to cause said machine to perform a special cycle of washing said first and second chambers before initiation of steady state operation of the machine, and to also perform a special cycle of washing at the end of a period of steady state operation, and for causing the machine to empty the cooking water at the end of a period of machine operation.

* * * * *